J. P. CROSTHWAIT.
MOWING MACHINE.
APPLICATION FILED JULY 21, 1909.
970,019.
Patented Sept. 13, 1910.
3 SHEETS—SHEET 1.
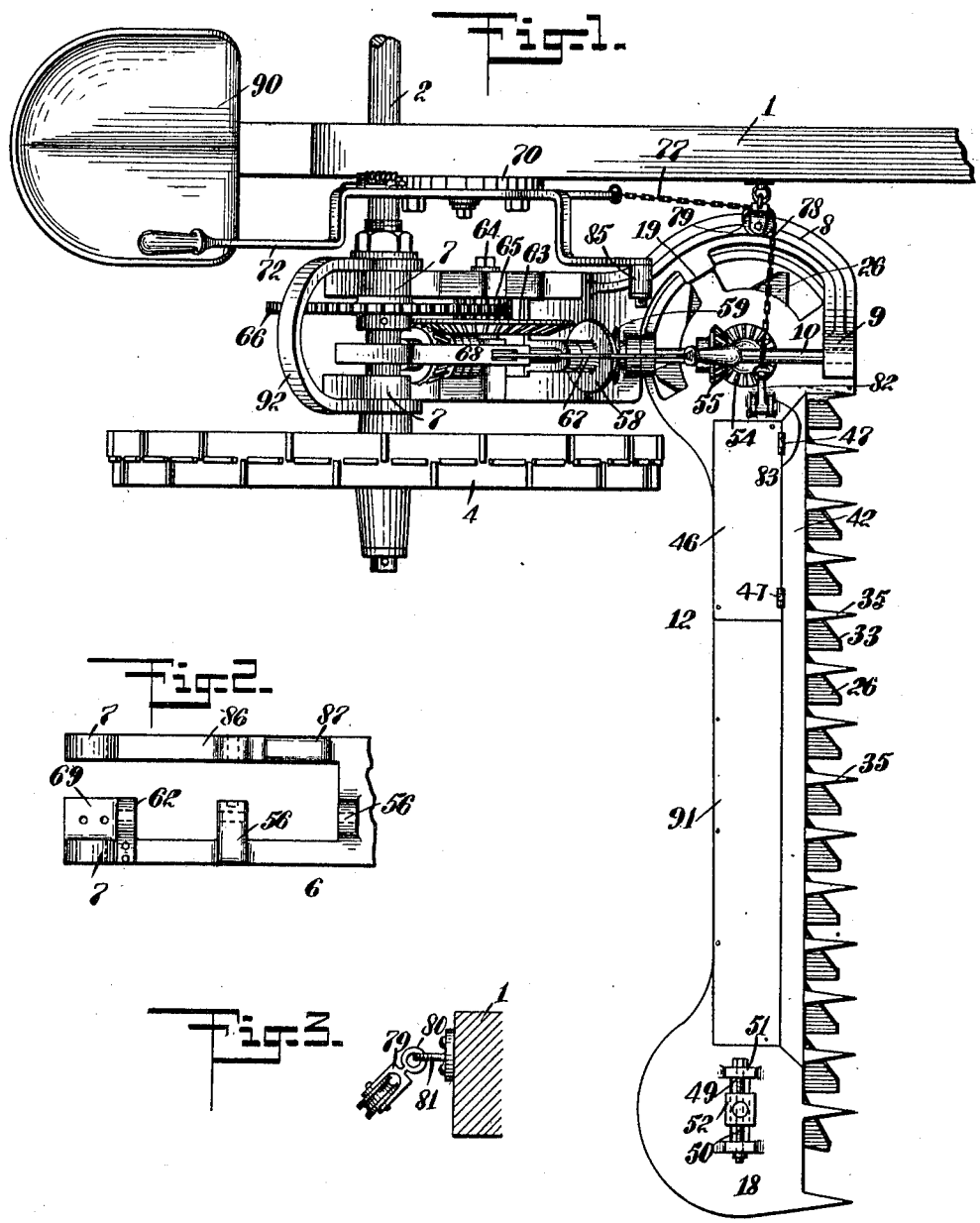
WITNESSES
INVENTOR
John P. Crosthwait
BY
ATTORNEYS

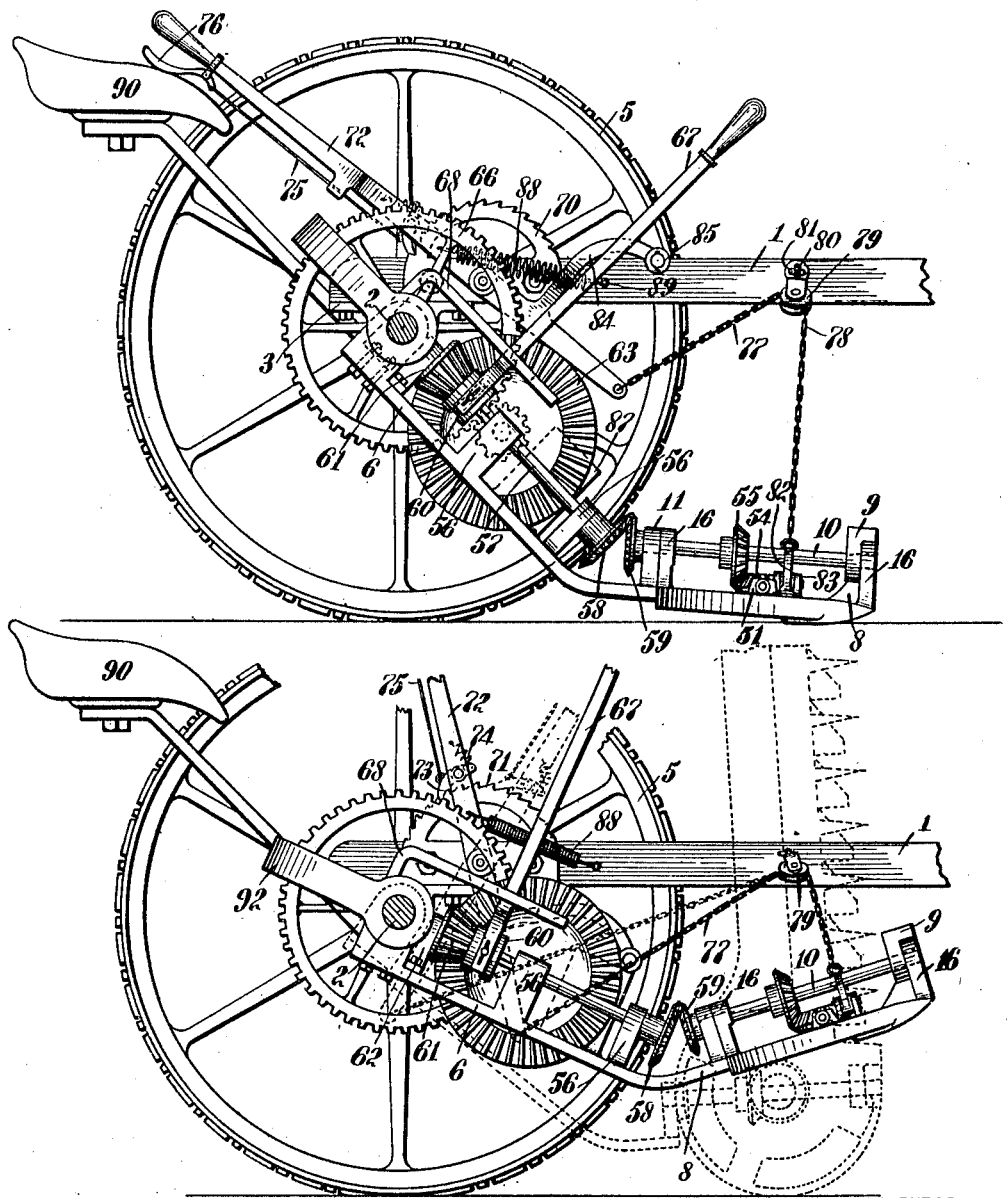

J. P. CROSTHWAIT.
MOWING MACHINE.
APPLICATION FILED JULY 21, 1909.
970,019.
Patented Sept. 13, 1910.
3 SHEETS—SHEET 3.
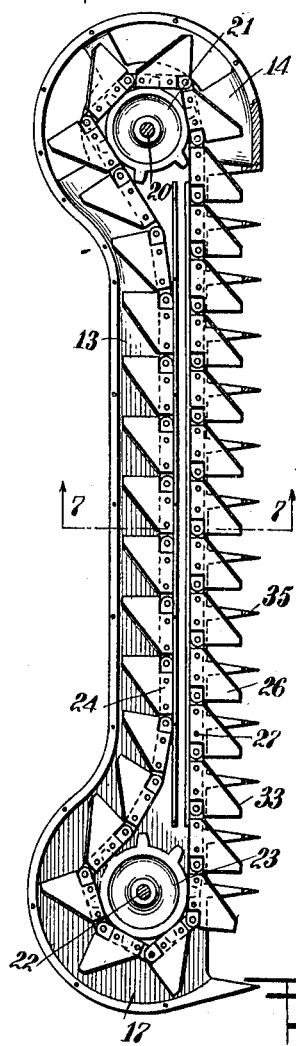
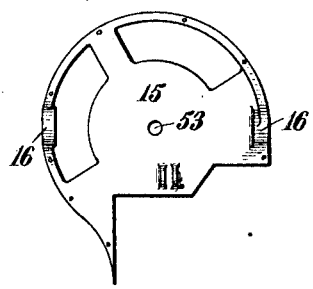
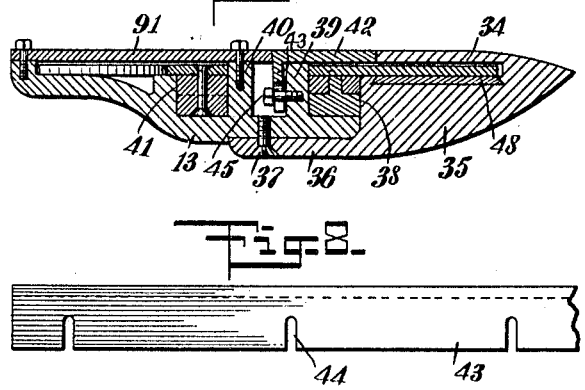
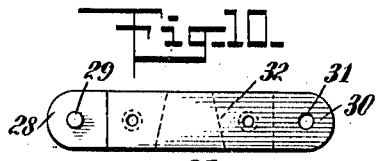
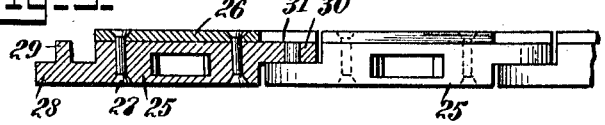
WITNESSES
INVENTOR
John P. Crosthwait
BY
ATTORNEYS

UNITED STATES PATENT OFFICE.

JOHN PERRY CROSTHWAIT, OF GEORGETOWN, KENTUCKY.

MOWING-MACHINE.

970,019.  Specification of Letters Patent.  Patented Sept. 13, 1910.

Application filed July 21, 1909. Serial No. 508,703.

*To all whom it may concern:*

Be it known that I, JOHN P. CROSTHWAIT, a citizen of the United States, and a resident of Georgetown, in the county of Scott and State of Kentucky, have invented a new and Improved Mowing-Machine, of which the following is a full, clear, and exact description.

This invention relates to mowing machines such as are drawn by draft animals, and which comprise a mower bar which is supported normally in a substantially horizontal position near the ground level, and which carries knives or cutters for cutting grass or a similar crop.

The object of the invention is to provide an improved construction for the mower bar and its supporting parts which will facilitate the raising of the mower bar so as to elevate it above obstructions such as stumps or boulders lying in its path. The construction is such that in addition to this movement the mower bar may be raised by the same lever to a substantially vertical position, which position it will occupy when the machine is being driven to and from the field.

A further object of the invention is to provide an improved construction for mounting and driving the cutters, which construction facilitates the renewal of the cutters when broken or worn.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a plan of a mowing machine constructed according to my invention, a portion of the pole and the left part of the machine being broken away; Fig. 2 is a plan of an arm the lower portion of which is formed into a shoe which supports the mower bar; Fig. 3 is a section and partial elevation showing the position and manner of supporting a snatch block which is instrumental in supporting the mower bar; Fig. 4 is a vertical section taken through the axle or shaft adjacent the inner face of the right hand wheel; this view shows the mower bar in its normal or cutting position and the pole of the machine is broken away; Fig. 5 is a view similar to Fig. 4, except that the upper part of the wheel and adjacent parts are broken away; in addition to this, this view shows the mower bar in an elevated position as though passing over a stump or similar obstruction in its path; in dotted lines this view shows the mower bar raised in its substantially vertical position as when the machine is being driven to or from the field; Fig. 6 is a plan and partial section showing the mower bar and the manner in which the cutters are supported when driven; Fig. 7 is a cross section on the line 7—7 of Fig. 6 upon an enlarged scale, and illustrating details of the construction of the mower bar; Fig. 8 is an elevation showing a portion of a friction plate for clamping the cutter chain; Fig. 9 is an elevation showing several links of the cutter chain, one of the said links being shown in longitudinal section; Fig. 10 is a plan of one of the links of the cutter chain and representing the same as though the cutter had been removed; Fig. 11 is a plan of one of the knives or cutters; and Fig. 12 is a plan showing the cover for the inner end of the cutter bar.

Referring more particularly to the parts, and especially to Figs. 1 to 5, inclusive, 1 represents the pole of the machine, the rear end of which projects over an axle 2 to which it is rotatably attached by a suitable bearing 3. This axle 2 is supported on wheels 4 and 5 disposed respectively at the right and left side of the machine. Either or both of these wheels may be made rigid with the axle 2 so that as the machine advances the axle will rotate. On the right end of the axle between the pole 1 and the wheel 4, an arm 6 is mounted by means of boxes 7 which are received on the axle. The body of this arm is normally in an inclined position, as shown in Fig. 4, and the lower end of the arm is bent upwardly and extends forwardly in an inclined position so as to form a shoe 8 which is adapted to run at the ground level. As indicated in Fig. 1, this shoe 8 is in the form of a curved extension or yoke, the outer extremity of which projects substantially at right angles to the pole. The outer end of this shoe 8 is formed into a bearing 9 for a counter-shaft 10, which shaft extends parallel with the pole. On the opposite side of the shoe, that is, on the rear side of the shoe, a bearing 11 is formed for the rear extremity of this shaft.

On the shaft 10 a mower bar 12 is attached. The details of the construction of this mower bar are clearly shown in Figs. 6 and 7. It has an elongated body 13, the inner extremity of which is formed into a substantially circular head 14. On this head there is attached a cover plate 15, which cover plate has upwardly extending ears 16 which are received on the shaft 10, as shown. At the outer end of the body 13 of the mower bar, a head 17 is formed which is of substantially circular form, and this head is similarly provided with a cover plate 18. The weight of the mower bar tends to rotate it upon the shaft 10, but the mower bar is held in a substantially horizontal position normally by means of a stop pin or lug 19 which projects inwardly from the inner portions of the shoe 8, as indicated in Fig. 1. This lug projects over the edge of the cover plate 15 so as to act as a stop when it is adjusted.

On the central axis of the head 14, a stub shaft 20 is provided which carries a sprocket wheel 21, and a similar shaft 22 is mounted in the outer head 17 and this shaft is provided with a sprocket wheel 23. Around these sprocket wheels runs an endless chain 24 which is formed of a plurality of links 25, as indicated in Fig. 9. These links are of elongated form and have thick bodies to which the cutters 26 are attached permanently by rivets 27, as shown. At one end of each link an extension or ear 28 is formed which is of a thickness equal to that of the body of the link, and this ear 28 is provided with an upwardly projecting pintle 29. On the opposite end of the link, a similar ear 30 is provided, but this ear is disposed at a higher elevation than the ear 28 and is also of substantially half the thickness of the body of the link. This ear 30 is provided with an opening 31 to receive the pintle of the next link. The bodies of the links are provided with tapered openings 32 which extend in from their edges, and these openings are adapted to be engaged by the teeth of the sprocket wheels 21 and 23, as will be readily understood.

The cutters 26 have substantially the form of right triangles, presenting inclined cutting edges 33. When the mower bar is in operation these cutters slide through slots 34 formed in guards or teeth 35 which have shanks 36 projecting under the bodies of the mower bar and attached permanently thereto by machine screws 37, as indicated. These shanks 36 are depressed so that the guards present vertical shoulders 38 which abut against the forward edge of the body 13 of the mower bar, as indicated in Fig. 7. On its upper side the body 13 of the mower bar is formed with a forward guide rib 39, and just to the rear of this rib, a similar rear guide rib 40 is formed. These ribs are for the purpose of guiding the chain 24. The forward side of the chain is guided between the rib 39 and the shoulder 38. To the rear of the rib 40 a guide groove 41 is formed in the upper face of the body 13, which guides the rear side of the chain.

The forward run of the chain is covered by a friction plate 42 which is of angular form, as shown. The body of this plate is in a substantially horizontal position and lies upon the upper edge of the rib 39 so that it projects out over the rear edges of the cutters, as indicated in Fig. 7. At its rear edge this friction plate 42 is provided with a downwardly projecting flange 43 which is provided at intervals with slots 44 which extend up from the lower edge thereof. These slots receive adjusting screws 45 which are fastened to the rear face of the rib 39. When these adjusting screws 45 are tightened up they increase the pressure of the friction plate 42 on the cutters so that in this way a slight resistance is offered to the movement of the chain.

Near the inner end of the mower bar, a door or lid 46 is formed, connected by hinges 47 to the rear edge of the friction plate 42. This door 46 may be raised when desired so as to give access to a part of the chain in replacing or repairing the cutters. The lower sides of the slots 34 of the guard are provided with wear plates 48, as shown in Fig. 7.

In order to adjust the distance between the sprocket wheels 21 and 23, the shaft 22 of the sprocket wheel 23 passes upwardly through a slot 49 formed in the cover 18. Above this slot an adjusting screw 50 is mounted in a lug 51 in the cover 18, and on this adjusting screw a block 52 is mounted in which the shaft 22 is attached. Evidently by rotating the screw 49 the sprocket wheel 23 can be made to approach or recede with respect to the sprocket wheel 21.

The shaft 20 extends upwardly through an opening 53 in the cover plate 15, and carries rigidly a bevel gear wheel 54. This bevel gear wheel meshes with a corresponding bevel gear wheel 55 which is rigidly carried on the shaft 10 so that when the shaft 10 is rotated, the chain 24 will be driven. On the upper side of the body of the arm 6, bearings 56 are provided for a driving shaft 57. This driving shaft is provided with a bevel gear wheel 58 at its lower extremity which meshes with a corresponding bevel gear wheel 59 on the shaft 10 so as to transmit rotation to the shaft 10, as will be readily understood. The upper end of the shaft 57 is provided with a clutch 60, which clutch enables it to be engaged with or disengaged from a bevel gear pinion 61. This bevel gear pinion 61 is rotatably mounted in a suitable bearing 62, and is adapted to be driven continuously by a large bevel gear wheel 63. This bevel gear wheel 63 is rotatably mounted at the side of the arm on a pivot bolt 64. On the inner face of the bevel gear wheel 63 a pinion 65 is rigidly attached, and this pinion is in mesh with a driving gear 66 which is rigidly attached to the axle 2, as shown. From this arrangement it will be evident that the axle 2 affords means for driving the cutter chain 24. The clutch 60 is provided an operating lever 67, which lever extends upwardly through an opening in a bracket 68, which bracket is rigidly secured to the arm on a web 69, as illustrated in Fig. 2. When the clutch lever 67 has the position shown in Figs. 4 and 5, the motion will be transmitted to the cutter chain. When moved toward the rear the lever 67 opens the clutch and disconnects the cutter bar, as will be readily understood.

On the right-hand side of the pole 1, near the axle 2, a ratchet segment 70 is mounted, said segment having inclined teeth 71 which project forwardly, as shown. At the center of this segment a lever 72 is attached, and this lever is provided with a pawl 73 which is normally kept in engagement with the teeth by a spring 74 which adjusts it to the tail of the pawl. The pawl may be raised out of engagement with the teeth by means of a guard or link 75 which extends downwardly along the rear edge of the lever and is operated by a grip lever 76, as will be readily understood. The forward and lower end of the lever 72 is connected by a chain 77 with the mower bar. This chain operates to support the mower bar; it passes upwardly from the lever 72 and forms a loop 78 which passes through a snatch block 79 which is attached on the right side of the pawl, as indicated. This block 79 is formed with a ring 80 which is attached to a staple 81 so that the block has perfect freedom of movement, as will be readily understood. The lower end of the chain 77 is attached to a link 82, the lower end of the said link being pivotally attached between two ears 83 formed on the upper side of the cover 15.

The lower end of the lever 72 is provided with an upwardly or laterally extending arm or extension 84, and this arm projects forwardly, as indicated. At its forward extremity it is provided with a roller 85. As indicated in Fig. 2, the arm 6 is bifurcated, and its inner fork 86 is provided with an upwardly projecting cam block 87. The extension or arm 84 is offset toward the right, as indicated in Fig. 1, so as to bring the roller 85 in the same plane as the cam block so that if the lever 72 is given sufficient movement the roller will come in contact with the block for a purpose which will appear more clearly hereinafter. On the body of the lever 72 above its fulcrum point, a counterbalancing spring 88 is provided which is of helical form, and the forward extremity of this spring is attached at 89 to the side of the pawl. This spring is always more or less in tension and tends to counterbalance the weight of the mower bar in raising or lowering it by means of the lever 72. At the rear end of the pole a seat 90 is attached, upon which the driver of the implement sits.

The mode of operation of the machine will now be described.

Fig. 4 represents the mower bar in its normal position. At this time the lever 72 is greatly inclined toward the rear and is, in fact, at the limit of its rearward movement. When it is desired to raise the mower bar to clear a stump or other obstruction lying in its path, the lever 72 is moved forwardly to about the position in which it is shown in Fig. 5. This movement draws in the chain 77 and lifts the shoe and the mower bar to the position shown in this figure. If it is desired to raise the mover bar to a vertical position, as indicated by the dotted lines, this can be accomplished by a further movement of the lever until it occupies the position indicated in dotted lines in Fig. 5. When this movement takes place, a greater amount of chain is taken in, and in addition to this the roller 85 strikes the upper face of the cam block 87 and depresses the block, and the forward end of the arm, that is, it depresses the shoe. This depression of the shoe and raising of the mower bar rotates the mower bar on the shaft 10 as an axis so that it comes into a substantially vertical position. When in this position the head 14 presents its normal inner edge to the ground so that it will slide readily along the ground as the machine advances. Attention is called to the fact that the chain 77 is attached to the mower bar near the shaft 10 so that the center of gravity of the mower bar has a relatively long lever arm. On this account the pulling in of the chain raises the shoe with the mower bar. If, on the other hand, the chain were attached far out on the mower bar, it would simply tend to rotate the mower bar on the shaft 10 instead of raising the arm and mower bar as though they were one piece.

When it is desired to substitute new cutters for damaged or broken cutters, this is done by simply opening the lid 46 and applying the cutters to the chain. The cutters should of course be permanently attached to separate links, and the link having the damaged cutter is simply lifted out of position and a new link substituted with the present cutter. The links can be detached as suggested since the pintles 29 simply slip into engagement with the ears 30.

A cover plate 91 is attached to the upper side of the mower bar which covers the rear run of the chain. The forward edge of this cover lies near the rear edge of the friction plate 42 and these two plates prevent the links from working loose from each other by moving upwardly.

The axle 2 is provided with a guard yoke 92, the ends of which are attached to the outer sides of the forks of the arm 6. This yoke extends upwardly over the gear wheel 66 and forms a protection against coming in contact with this gear.

Having thus described my invention, I claim as new and desire to secure by Letters Patent,—

1. A mowing machine having an arm mounted thereupon and adapted to swing downwardly, a mower bar pivotally supported on said arm and tending by gravity to swing downwardly, a stop on said arm limiting the downward swinging movement of said mower bar, and means attached to said mower bar near the point of support thereof for raising the same and for simultaneously swinging the said arm upwardly.

2. A mowing machine having an arm mounted thereupon and adapted to swing downwardly, a mower bar pivotally supported on said arm and tending by gravity to swing downwardly, a stop on said arm limiting the downward swinging movement of said mower bar, means attached to said mower bar near the point of support thereof for raising the same and for simultaneously swinging the said arm upwardly, cutters mounted on said mower bar, and means for driving said cutters from said axle.

3. A mowing machine having an arm supported thereupon and adapted to swing downwardly, a mower bar pivotally attached to said arm and normally projecting therefrom in a depressed position, a chain connected to said mower bar, and a lever attached to said chain and adapted to raise said mower bar and swing said arm upwardly simultaneously, said lever having an extension adapted to depress said arm by a complete movement of said lever so as to depress said arm and rotate said mower bar upon its pivotal mounting on said arm.

4. A mowing machine having an axle, an arm rotatably mounted on said axle, a mower bar rotatably mounted on said arm, a chain connected with said mower bar near said arm, and a lever attached to said chain for raising said mower bar by swinging said arm upwardly, said lever having an extension adapted to depress said arm so as to swing said mower bar upwardly by rotating the same upon its pivotal mounting on said arm.

5. A mowing machine having an arm mounted to swing in a substantially vertical plane, a mower bar pivotally mounted on said arm, and a controlling member connected with said mower bar and having means for engaging said arm, said controlling member affording means for raising said mower bar and said arm simultaneously by a partial movement and affording means for depressing said arm and rotating said mower bar upwardly thereupon by a complete movement.

In testimony whereof I have signed my name to this specification in the presence of two subscribing witnesses.

JOHN PERRY CROSTHWAIT.

Witnesses:
W. C. WARRING,
A. P. BRISCOE.